UNITED STATES PATENT OFFICE.

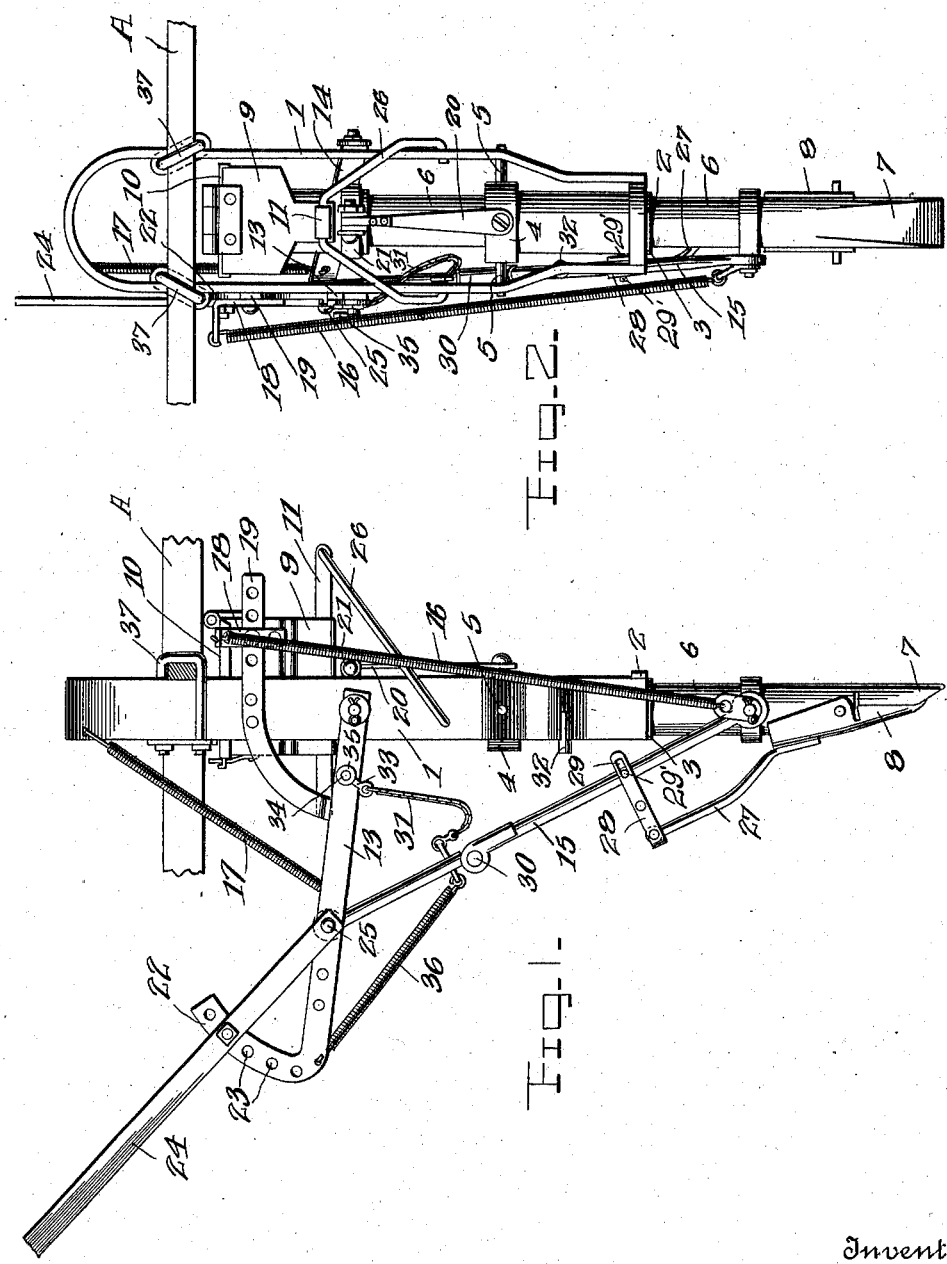

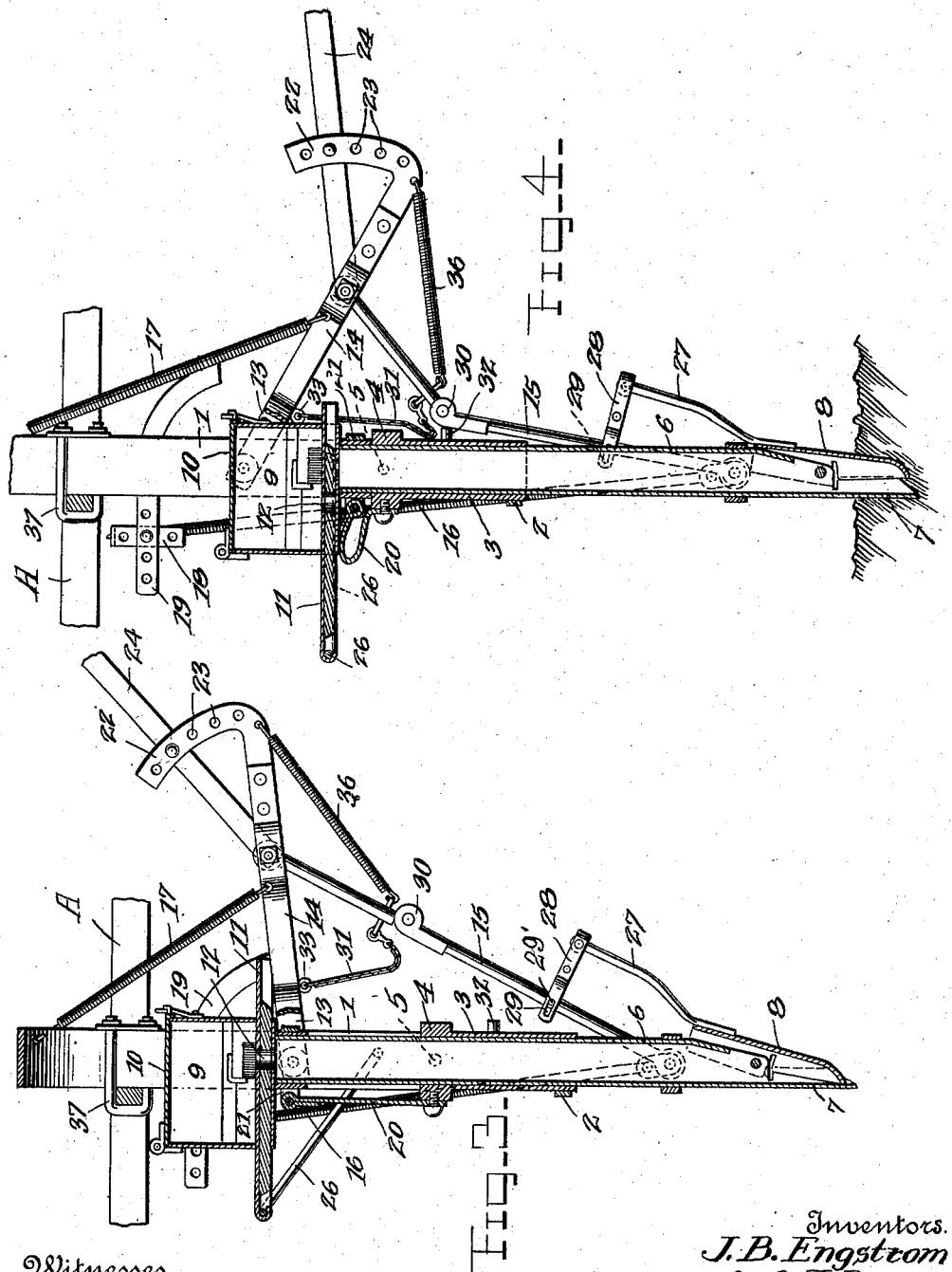

JACOB B. ENGSTROM AND OREN J. PAGE, OF MANCHESTER, IOWA.

REPLANTING ATTACHMENT FOR CULTIVATORS.

965,801.  Specification of Letters Patent.  Patented July 26, 1910.

Application filed November 2, 1909. Serial No. 525,907.

*To all whom it may concern:*

Be it known that we, JACOB B. ENGSTROM and OREN J. PAGE, citizens of the United States, residing at Manchester, in the county of Delaware and State of Iowa, have invented certain new and useful Improvements in Replanting Attachments for Cultivators; and we do declare the following to be a full, clear, and exact description of the invention, such as will enable others skilled in the art to which it appertains to make and use the same.

This invention relates to improvements in seed planters.

The object of the invention is to provide a planter of this character which is particularly adapted for attachment to cultivators whereby the hills that have failed to come up may be readily replanted as the rows are cultivated.

A further object is to provide a device of this character having means whereby a hole is made in the ground and the seed discharging mechanism opened at the proper time to discharge seeds in the hole.

With these and other objects in view, the invention consists of certain novel features of construction, combination and arrangement of parts, as will be more fully described and particularly pointed out in the appended claims.

In the accompanying drawings, Figure 1 is a side view of a planter showing the same attached to a cultivator frame; Fig. 2 is a front elevation of the same; Fig. 3 is a vertical sectional view showing the parts in inoperative position; and Fig. 4 is a similar view showing the parts in operative position.

Referring more particularly to the drawings, 1 indicates the supporting frame of the planter, said frame being here shown and is preferably bail-shaped and has its lower ends connected together by a brace bar 2, which also forms a stop the purpose of which will hereinafter appear. Pivotally mounted in the lower portion of the frame, 1, is a tubular guide cylinder, 3, on the upper end of which is secured a collar, 4, having laterally projecting trunnions, 5, which are pivotally engaged with suitable bearing apertures formed in the opposite sides of the frame as shown.

Slidably mounted in the guide cylinder, 3, is the seed tube, 6, on the lower end of which is arranged a spade, 7, which co-acts with and forms one part of a seed discharging mechanism, the other part of which comprises a valve, 8, which is pivotally connected to the lower end of the tube and when in closed or in an inoperative position is adapted to engage the inner side of the spade, 7, and thereby close the discharge end of the tube. To the upper end of the valve, 8, is connected an operating mechanism hereinafter described.

On the upper end of the tube, 6, is secured a seed hopper, 9, having a cover, 10. In the lower portion of the hopper, 9, is slidably mounted a feed valve comprising a bar, 11, in which is formed a seed pocket, 12, which, when the bar is reciprocated in the lower portion of the hopper is adapted to receive the seed and to discharge the same into the upper end of the seed tube by means of which the seeds are conducted to the discharging and planting mechanism hereinbefore described.

The seed tube is depressed or projected into operative position by means of an operating lever, 13, which is pivotally connected at one end to one side of the frame, 1, and is preferably braced by a diagonally arranged brace rod, 14, which is secured to the lever near its outer end and is pivotally connected to the opposite side of the frame, 1, as shown. The lever, 13, is here shown and is preferably connected to the lower end of the seed tube by an inclined jointed operating rod, 15, whereby, when the lever is depressed the seed will be forced downwardly and the spade, 7, on the lower end thereof, projected into the ground a suitable distance for planting the seed. The lever, 13, and the seed tube are retracted to their normal or inoperative position after pressure on the lever is released by means of a main retracting spring, 16, and an auxiliary retracting spring, 17. The spring, 16, is connected at its lower end to the lower portion of the seed tube and at its upper end to an adjustable bracket, 18, secured to the extended end of a stop arm, 19, secured to the side of the frame, 1, and arranged to form a stop for and to limit the upward movement of the operating lever.

The spring, 17, is connected at one end to the upper portion of the frame, 1, and at its opposite end to the brace 14, of the lever, 13, as shown. The upward movement of the seed tube when retracted by the springs, 16 and 17, is further limited by a flexible connection, 20, secured at its lower end to the collar portion, 4, of the guide cylinder and at its upper end to the upper portion of the seed tube by means of a clip, 21, or other similar fastening device. On the outer end of the lever, 13, is formed an upwardly projecting curved adjusting lug, 22, having formed therein a series of bolt holes, 23, whereby a handle or extension rod, 24, may be adjustably connected with the lever to permit the operation of the latter from any desired point on the cultivator. The inner end of the handle or extension rod, 24, is pivotally connected to the lever in any suitable manner but is here shown and is preferably connected by means of the bolt, 25, which secures the upper end of the tube operating rod, 15.

The valve or feed bar, 11, is reciprocated in the lower portion of the hopper to discharge the proper quantity of seed at the correct time by means of a bail-shaped operating link or rod, 26, the outer lower end of which is loosely connected with the forward end of the bar while the inner ends of the link are bent at right angles to form trunnions which are pivotally engaged with bearing apertures formed in the opposite side bars of the frame, 1, as shown. By means of the link, 26, the valve bar, 11, will be pulled inwardly when the hopper and seed tube are depressed (see Fig. 4) by the operating lever, 13, thus bringing the pocket, 12, in the bar, 11, in position to receive seed from the hopper and when the lever is released and the seed tube and hopper retracted by the springs connected thereto, the bar, 11, will be retracted or moved back thus bringing the pocket, 12, over the open upper end of the seed tube (see Fig. 3). When the valve bar is thus retracted the seeds in the pocket, 12, will drop into the seed tube and will be conveyed thereby to the discharging mechanism where they are held until the hole has been made in the ground and the discharging mechanism operated.

The mechanism for operating the seed discharging valve, 8, at the lower end of the seed tube consists of an arm, 27, which is secured at its lower end to the upper portion of the pivoted valve, 8, as shown. The upper end of the arm, 27, is connected to the jointed tube operating rod, 15, by means of a link, 28, one end of which is pivotally connected to the arm, 27, while the opposite end is bifurcated and slotted as shown at 29 to engage oppositely projecting connecting pins, 29′, on the lower portion of the jointed tube operating rod, 15. The upper and lower portions of the rod, 15 are connected together by a rule joint, 30, and the upper portion of the rod adjacent to said joint is connected by a chain or other flexible connection, 31, to the operating lever, 13, whereby, when said lever is depressed the chain or flexible connection, 31, will be drawn tight and caused to break the rod, 15, at its joint. When the rod has thus been broken a continued downward movement of the lever will cause the upper portion of the rod to force the inner portion forwardly thereby pulling upon the arm, 24, through the link connection, 28, and thus open the valve, 8, to permit the seed held thereby to discharge into the hole which has been previously formed by the spade, 7. On the rear side of the frame, 1, is preferably formed a stop lug, 32, against which a portion of the arm, 15, strikes when operated to open the valve, 8 in the manner just described thereby limiting the movement of said rod. The chain or flexible connection, 31, is preferably provided on its upper end with an elongated link, 33, which engages a bolt, 34, on the lever, 13, and is adjustably clamped in position against the lever by means of a thumb nut, 35, thereby providing for the adjustment of the chain to cause the valve actuating mechanism to operate at the proper time when the lever and seed tube are depressed. The rod, 15, is straightened and the parts actuated thereby brought to their normal position by means of a coiled retracting spring, 36, one end of which is connected to the upper portion of the operating rod and the other end to the lever, 13, as shown.

As stated in the beginning of the specification the planter is particularly adapted for use in connection with a plow or cultivator whereby the hills that were missed in the original planting or which failed to germinate may be replanted as the field is cultivated. When the planter is thus employed the frame 1, is secured to a suitable part of the cultivator frame such as the beam A, preferably by means of clips, 37, which extend diagonally around the beam A and the upper portion of the planter frame 1 as shown in Fig. 2. While the planter is described as being particularly adapted for use in connection with plows or cultivators it is obvious that the same may be mounted and operated in a suitable supporting frame or mechanism of its own.

In order to facilitate the filling of the seed hopper the guide cylinder, 3, is pivotally mounted in the frame, 1 as hereinbefore described to permit the same and the seed tube to be swung rearwardly in the frame 1, thus bringing the hopper to a position that the cover, 10, may be readily opened and seed placed in the hopper. After the seed has thus been placed in the hopper the spring, 16, will swing the seed tube and the parts mounted thereon back to their normal position. When the seed tube and cylinder have thus been swung back they will be stopped and held in operative position against the tension of the spring, 16, by means of the brace bar, 2, hereinbefore described.

From the foregoing, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described our invention, what we claim is:—

1. In a planter of the character described, a supporting frame, a guide cylinder pivotally mounted in said frame, a seed tube slidably mounted in said cylinder, an operating lever pivotally mounted on said frame, a jointed operating rod to connect said lever with the tube, a combined hole forming and seed discharging mechanism carried by the lower end of said tube, means to connect said seed discharging mechanism with said jointed operating rod, means to connect said operating rod with the lever whereby the latter is actuated to operate said seed discharging mechanism when the lever and seed tube are depressed, springs to restore said parts to their normal positions, and a seed hopper arranged to discharge the seed into said tube.

2. In a seed planter, the combination of a supporting frame, a guide pivotally mounted in said frame, a seed tube slidably mounted in said guide, a combined hole forming and seed discharging mechanism arranged on the lower end of said tube, a hopper mounted on the upper end of said tube, a seed valve slidable transversely in said hopper, a bail shaped member pivotally connected intermediately of its ends to one end of said slidable seed valve and having its ends connected to said supporting frame, a coiled spring connected at one end to said frame near its upper end and at its other end to the lower end of said tube, and means for depressing said tube against the tension of said spring and for opening the seed discharging means on the end of said tube.

3. A seed planter comprising a supporting frame, a seed tube mounted to slide vertically in said frame and having seed discharging means at its lower end, an operating lever pivotally connected at one end to said frame, a jointed rod pivotally connected at one end to said lever and at its other end to the lower end of said tube, a flexible element connected to the inner end of said lever and to said rod adjacent to and above the joint therein, a spring connected to return said rod to normal position after the joint has been broken, and means connected with said rod and operable thereby for opening and closing the seed discharge means.

4. A seed planter comprising a supporting frame, a seed tube mounted to slide vertically in said frame and having seed discharging means at its lower end, an operating lever pivotally connected at one end to said frame, a jointed rod pivotally connected at one end to said lever and at its other end to the lower end of said tube, a member connecting said seed discharge means with said rod, means for limiting the downward movement of said tube, said operating lever being operable to break the joint in said rod after the tube has reached the limit of its downward movement whereby said seed discharging means is opened.

5. A seed planter comprising a supporting frame, a seed tube mounted to slide vertically in said frame and having pivotally mounted seed discharging means at its lower end, an operating lever pivotally connected at one end to said lever and at its other end to the lower end of said tube, an L-shaped member connected at the free end of one arm to said discharge means and at the free end of its other arm to said rod, means for limiting the downward movement of said tube, said operating lever being operable to break the joint in said rod after the tube has reached the limit of its downward movement to open said seed discharging means.

6. A seed planter comprising a supporting frame, a seed tube mounted to slide vertically in said frame and having seed discharging means at its lower end, an operating lever pivotally connected at one end to said frame, a jointed rod pivotally connected at one end to said lever and at its other end to the lower end of said tube, a flexible element connected to the inner end of said lever and to said rod adjacent to and above the joint therein, a spring connected to return said rod to normal position after the joint has been broken, and an L-shaped member connected at the free end of one arm to said discharge means and at the free end of its other arm to said rod, said last mentioned arm being slotted longitudinally and engaged with a laterally extending stud on said rod.

In testimony whereof we have hereunto set our hands in presence of two subscribing witnesses.

JACOB B. ENGSTROM.
OREN J. PAGE.

Witnesses:
A. O. STANGER,
FRED B. BLAIR.